J. G. FLORACK.
ANTISKID ATTACHMENT FOR AUTOMOBILE TIRES.
APPLICATION FILED OCT. 14, 1912.
1,077,401.                    Patented Nov. 4, 1913.
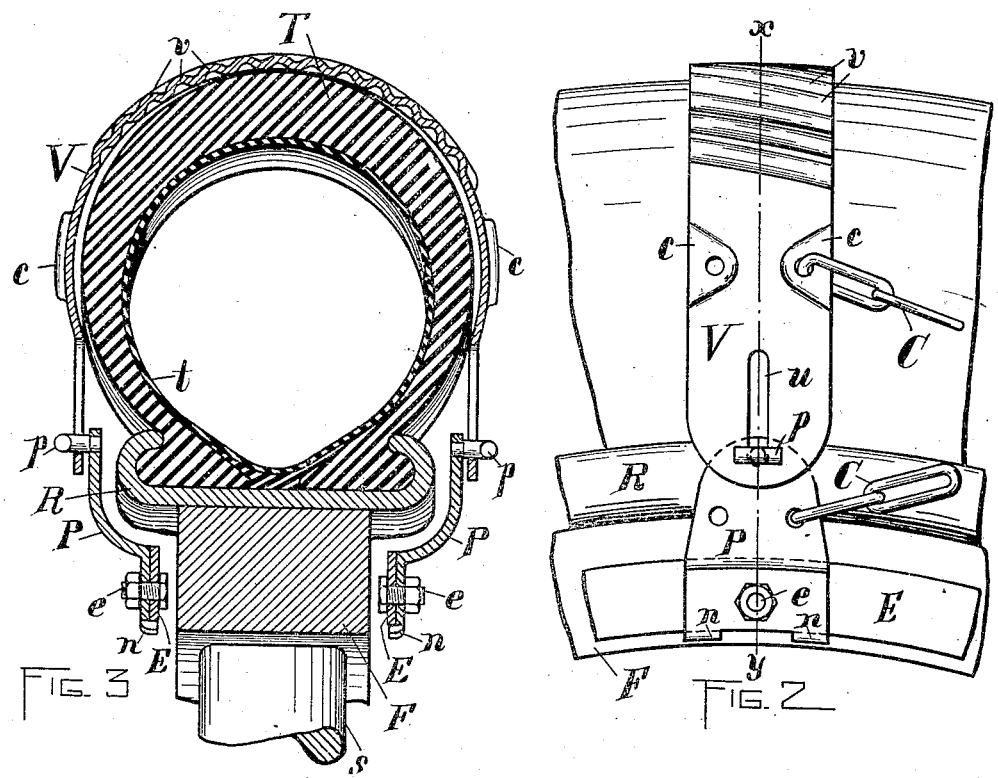
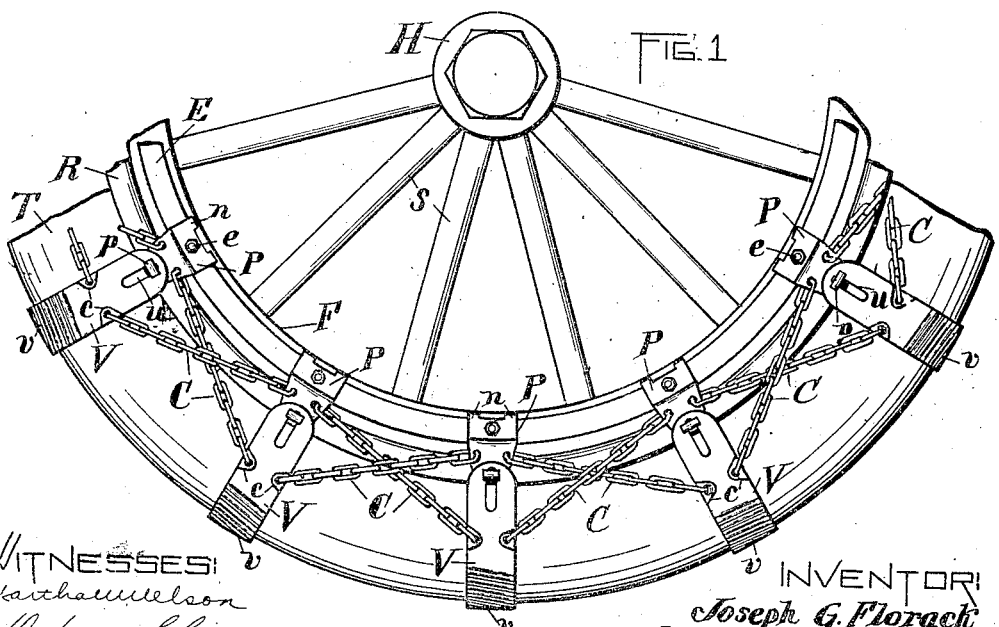

UNITED STATES PATENT OFFICE.

JOSEPH G. FLORACK, OF ROCHESTER, NEW YORK.

ANTISKID ATTACHMENT FOR AUTOMOBILE-TIRES.

1,077,401.  Specification of Letters Patent.  Patented Nov. 4, 1913.

Application filed October 14, 1912. Serial No. 725,631.

*To all whom it may concern:*

Be it known that I, JOSEPH G. FLORACK, a citizen of the United States, and a resident of Rochester, in the county of Monroe and State of New York, have invented a new and Improved Antiskid Attachment for Automobile-Tires, of which the following is a specification.

This invention relates to means for preventing the skidding of automobile wheels.

The object of my invention is to provide a cheap, efficient and readily attachable and detachable anti-skidding device.

With these objects in view my invention comprises a series of tread pieces adapted to engage around the outer periphery of an automobile tire and in planes substantially radially to the axis of the wheel on which the tire is located. These members are mounted to freely move inwardly and outwardly radially of the wheel and they are also pivotally mounted so as to permit of their occupying positions in different planes angularly disposed with reference to the radial planes which they normally occupy. These tread pieces are composed, preferably, of steel forgings adapted to engage over the outer surface of a tire and to extend inwardly on each side thereof, and their outer surfaces are so conformed as to tend to prevent the skidding of the wheel and on their inner surfaces they are so conformed as not to injure the tire.

The parts of the tread pieces engaging inwardly on each side of the tire are provided with slots and they are held in place by clips having T heads thereon engaging through the slots and turnable therein for the purpose of insertion and removal and they are held securely in locking position to prevent their withdrawal from the slots by means to be described, and to this end the clips may, preferably, be mounted on a continuous ring on each side of the wheel and within the circle of the tire in such a way as to permit of their moving eccentrically of the wheel to compensate at least partially for the flattening of the tire on the lower side as it engages the road bed. The slots in the tread pieces supplement this action in a way to permit all necessary radial movement of the tread pieces for all conditions of pneumatic tension under which the tire should be used.

Flexible connections, such as chains, are used in the manner shown tending to both restore and hold the tread pieces in their normal positions in radial planes.

The accompanying drawings illustrating my invention are as follows:—

Figure 1 is a side view of a portion of a wheel having an anti-skid device thereon embodying my invention. Fig. 2 is an enlarged side view of a small part of the wheel showing one of the tread pieces and a part of the attaching device. Fig. 3 is a transverse sectional view taken along the line $x$—$y$ of Fig. 2 with all parts to the left of the line removed.

Similar parts are designated by similar reference characters throughout the several figures of the drawings.

Referring to the drawings,—T represents the usual outer tire and $t$ the inner tube.

R is the rim of the wheel shown in this instance as of the usual clencher type.

F is the felly and at $s$ are seen the spokes while at H, in Fig. 1, is seen the hub of the wheel.

V shows one of the tread pieces corrugated as seen at $v$ and provided with outwardly formed bosses or lugs $c$ having openings therethrough for receiving the bracing chains C. The tread pieces V are substantially U shaped and have their free ends extending inwardly in approximately radial lines and are provided with radially extending slots near their inner ends as seen at $u$.

P are the attaching clips having short T shaped projections or bolts $p$ adapted, when the clips are turned at right angles to their normal positions, to prevent their withdrawal from said slots as seen. The attaching clips P are curved, as seen in Fig. 3, and extend inwardly to engage against the supporting and attaching rings E. Holes are provided through these rings E and through the inner ends of the clips P for receiving bolts $e$ by means of which the clips P may be securely attached to the rings E and, to prevent angular movement of the clips P relative to the rings E, ears or lugs $n$ are formed on the clips P adapted to engage under and against the inner peripheral edge of the rings E. The T bolts $p$ on the clips P are inserted through the slots $u$ in the treads V prior to the attachment of the clips P to the rings E. The clips P are also provided with holes for receiving chains C as a means to aid in holding the tread pieces V in normal positions and against displacement in the movement of the wheel. The outer ends of the chains C engage through and are secured in openings therefor in the bosses c comprising portions of the tread pieces forced outwardly from the normal plane of the metal for the purpose of providing increased room for the chains on each side of the tire. Such chains then will, each one, engage at one end through the hole therefor in a lug c and at the other end through a hole therefor in the clip P of the adjacent tread piece.

The preferable method of assembling an anti-skid device in accordance with my invention is as follows, viz,—The clips P are inserted, by means of the T shaped projections p thereon, through the slots therefor in the side arms of the tread pieces V and such tread pieces thereafter inserted over the tire after which the clips P are secured to the rings E by means of the bolts e.

It is believed from the foregoing description of the construction and operation of the several parts of an anti-skidding device in accordance with my invention that the method of using the same is sufficiently clear to call for no further explanation herein.

The tread pieces may be, as indicated in Fig. 3, conformed to receive the tire when slightly flattened as it engages against the road bed and they will, therefore, of course be of a somewhat flatter curvature than the normal curvature of the tire (in radial planes) at its upper periphery.

What I claim is:

1. A device for the purpose described comprising a series of tread pieces having inwardly extending side arms, a common supporting element with the side arms of the tread pieces slidably mounted thereon to move in radial planes, and flexible connections between the tread pieces tending to return them to and hold them in relative normal positions in radial planes, such flexible connections comprising chains connecting each tread piece to the supporting element at points adjacent to the tread piece on each side thereof.

2. A device for the purpose described comprising a series of tread pieces having inwardly extending side arms, a common supporting element with the side arms of the tread pieces slidably mounted thereon to move in radial planes and also pivotally mounted thereon to swing to positions departing angularly from radial planes, and flexible connections between the tread pieces tending to return them to and hold them in relative normal positions in radial planes, such flexible connections comprising chains connecting each tread piece to the supporting element at points adjacent to the tread piece on each side thereof.

3. A device for the purpose described comprising a series of tread pieces having inwardly extending side arms, a ring on each side of the wheel, attaching members on the rings upon which the side arms of the tread pieces are slidably mounted to move in planes extending radially of the wheel and rings, the rings being otherwise unattached to the wheel or tire, and flexible connections between the tread pieces tending to return them to and hold them in relative normal positions in radial planes, such flexible connections comprising chains connecting each tread piece to the attaching member of the adjacent tread piece on each side thereof.

4. A device for the purpose described comprising a series of tread pieces having inwardly extending side arms, a ring on each side of the wheel, attaching members on the rings upon which the side arms of the tread pieces are slidably mounted to move in planes extending radially of the wheel and rings and pivotally mounted thereon to swing to positions departing angularly from radial planes, the rings being otherwise unattached to the wheel or tire, and flexible connections between the tread pieces tending to return them to and hold them in relative normal positions in radial planes, such flexible connections comprising chains connecting each tread piece to the attaching member of the adjacent tread piece on each side thereof.

JOSEPH G. FLORACK.

Witnesses:
 MARTHA M. NELSON,
 OSBORNE F. GURNEY.